Aug. 30, 1949. M. BRADNER ET AL 2,480,703
ROLL SURFACE TEMPERATURE MEASURING DEVICE
Filed Nov. 19, 1947 3 Sheets-Sheet 3
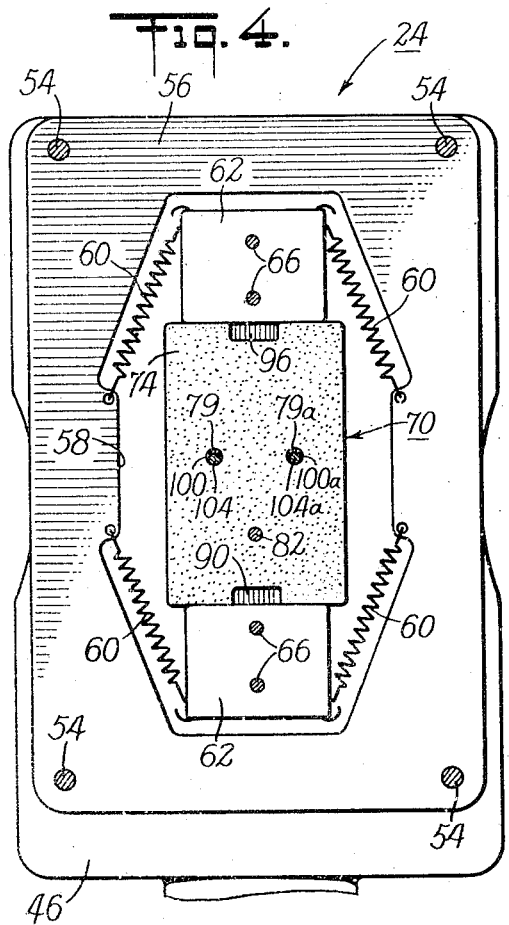
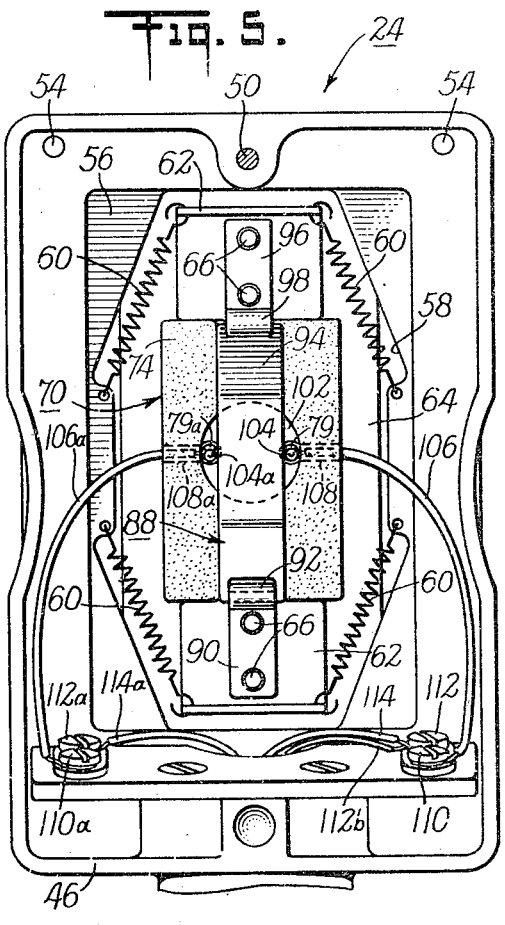
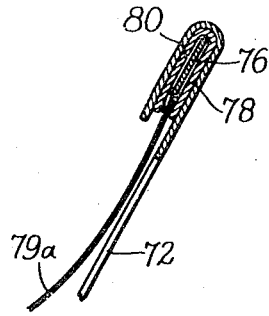
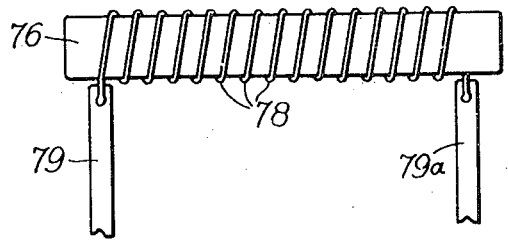
INVENTORS
Mead Bradner
Albert Allen
BY
Blair, Curtis + Hayward
ATTORNEYS Patented Aug. 30, 1949

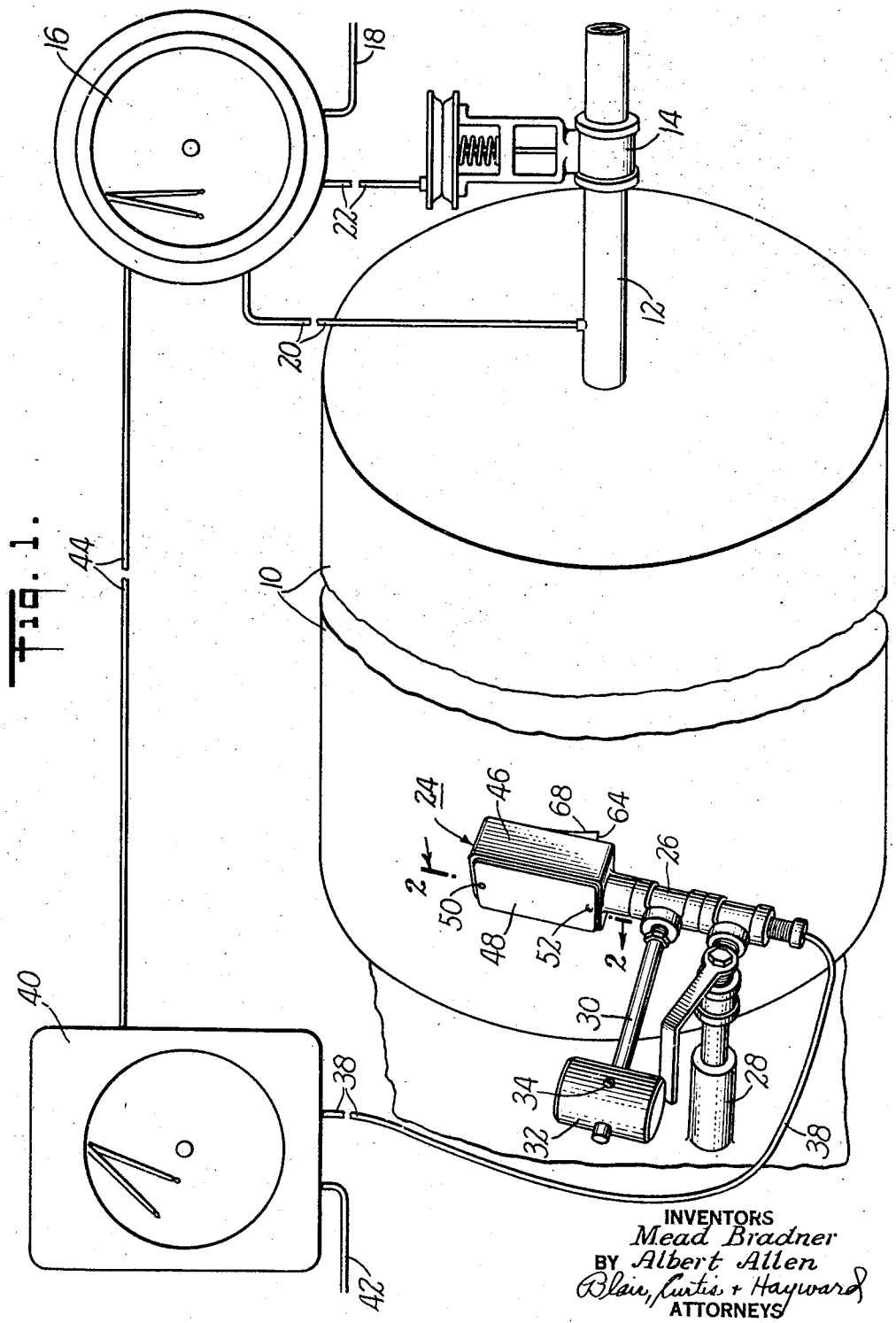

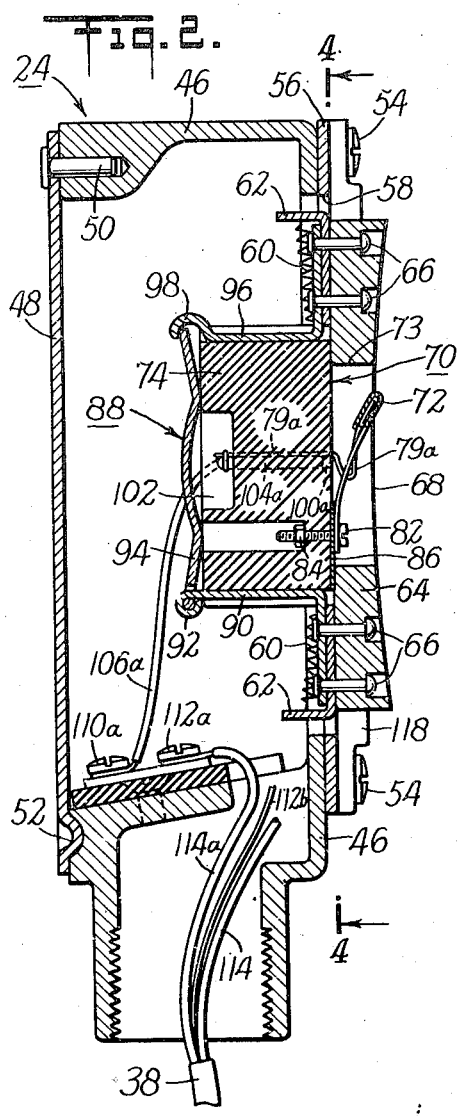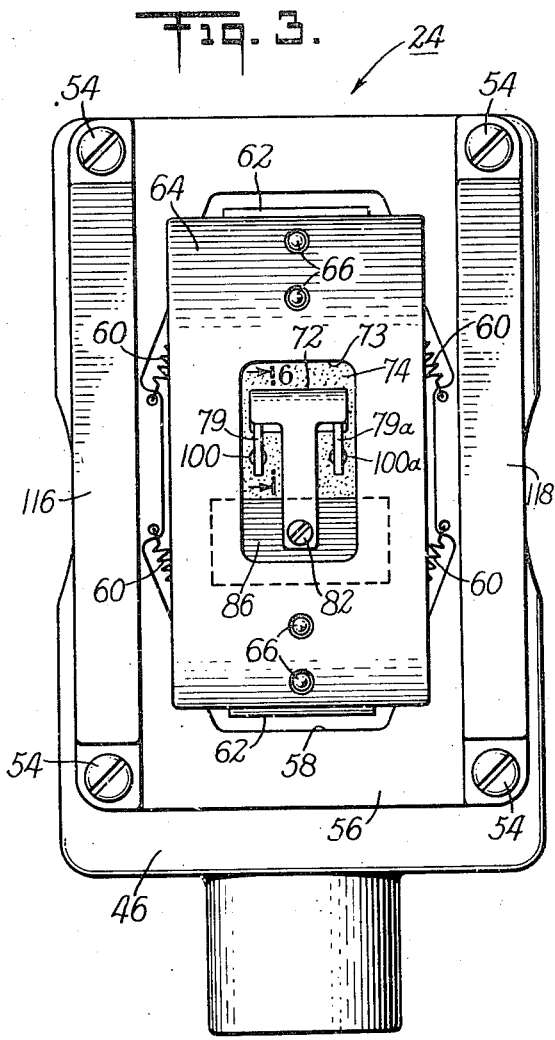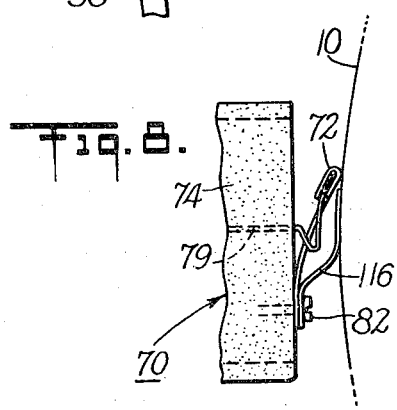

2,480,703

UNITED STATES PATENT OFFICE 2,480,703

ROLL SURFACE TEMPERATURE MEASURING DEVICE

Mead Bradner, Walpole, and Albert Allen, Sharon, Mass., assignors to The Foxboro Company, Foxboro, Mass., a corporation of Massachusetts Application November 19, 1947, Serial No. 787,008

9 Claims. (Cl. 73—351)

This invention relates to the measurement and/or control of the surface temperature of a moving heated or chilled surface such as the heated surface of a drying or calender roll used, for example, in the paper and textile industry, or the heated rolls used in milling rubber, plastics and the like. Such rolls are ordinarily heated by steam supplied to the interior of the roll, and the surface temperature of the roll may be controlled by regulating the steam supplied to the roll in response to changes in roll surface temperature as measured by a temperature-sensitive element in contact with the roll surface. In certain applications it is important that the surface temperature of the roll be accurately maintained within close limits and the effectiveness with which such close control can be achieved depends, to a considerable extent, on the accuracy with which the roll surface temperature can be measured.

The measurement of the surface temperature of such a heated roll or drying drum has always been a difficult measurement to make accurately, and the deficiencies of the previously used sensitive elements have made it impossible to achieve the accuracy of control desired by industry users of such rolls. In some cases the mass of the sensitive element has been so large that the element has been unduly slow in responding to variations in roll surface temperature and has presented such a large surface area to the ambient atmosphere that it has lost appreciable amounts of heat by convection and radiation. In other cases wherein lighter elements have been used, errors have been introduced due to heat losses from the element by conduction, radiation or convection, or due to frictional effects which result from the rubbing of the element against the roll surface. Also the relatively heavy elements previously used have tended to score the roll surface. In the lighter elements thermocouples have been used as temperature-sensitive devices in structures different from that disclosed herein and this has given rise to the additional difficulty of measuring accurately the relatively small thermocouple voltages produced at temperatures within the usual operating range of such rolls.

It is accordingly an object of the present invention to provide improved apparatus for measuring and indicating, recording and/or controlling the surface temperature of a moving heated surface. It is another object of the invention to provide a temperature-sensitive element that is accurately and rapidly responsive to the temperature of the surface of a heated rotating roll. It is still another object of the invention to provide a temperature-measuring head for measuring the surface temperature of such a heated roll, which head includes a temperature-sensitive element that bears against the roll surface with a predetermined small force that is small enough to minimize frictional effects and at the time is sufficient to insure continuous contact between the element and roll surface. It is a still further object of the invention to provide a temperature head and sensitive element of this type that is so constructed as to minimize heat losses from the element. Other objects of the invention will be in part obvious and in part pointed out hereafter.

The many objects and advantages of the present invention may best be appreciated by reference to the accompanying drawings which illustrate apparatus incorporating a preferred embodiment of the present invention and wherein:

Figure 1 is a perspective view of a steam-heated rotatable roll with a surface temperature measuring head mounted in operative relation with respect to the roll. In Figure 1 the measuring head is associated with indicating and recording apparatus for indicating and recording the surface temperature, and with control apparatus for regulating the steam flow to the roll to control the surface temperature thereof;

Figure 2 is a longitudinal section through the head taken on the line 2—2 of Figure 1 and showing the manner in which the temperature-sensitive element is mounted in the head;

Figure 3 is a front elevation view of the roll-contacting face of the head;

Figure 4 is a transverse section taken on the line 4—4 of Figure 2 and showing the spring mounting of the face plate and element;

Figure 5 is a rear view of the head with the cover plate removed, showing the manner in which the element-supporting-block is clamped to the face plate;

Figure 6 is a section taken on the line 6—6 of Figure 3 and showing certain details of the construction and mounting of the sensitive element;

Figure 7 is a detailed view of the sensitive element; and

Figure 8 is a side view of the insulating block showing an alternative method of supplying heat to the insulating block.

Referring to the drawings and more particularly to Figure 1, the numeral 10 designates a rotatable roll which may be, for example, a drying, calender or mill roll that is internally heated with steam introduced through a pipe 12 provided with a pneumatically-operated regulating valve 14. The flow of steam to the roll 10 through pipe 12 is regulated by a pneumatically-operated controller 16 of conventional construction to maintain the steam pressure within the roll 10 at a desired value. The controller 16 receives air under pressure through a pipe 18 and is effectively responsive to the steam pressure within the roll through a pipe 20, the operation of controller 16 being such as to create in a pipe 22, which interconnects the controller with regulating valve 14, a pneumatic pressure that is so related to the pressure in pipe 20 as to adjust the position of valve 14 to maintain the steam pressure within the roll 10 at a desired value.

Mounted adjacent to the roll 10 and bearing lightly against the surface thereof, there is a surface temperature measuring head 24 mounted on a fitting 26, which is in turn swivelly mounted on the fixed support 28. Extending outwardly from the fitting 26 there is an arm 30 provided at its outer end with a counterweight 32 which is fixed to the arm 30 by a set screw 34 so that the counterweight 32 may be adjusted along arm 30 to adjust the force with which the head 24 bears against the surface of roll 10.

As described in detail hereafter, the measuring head 24 includes a temperature-responsive element comprising a length of fine wire having an electrical resistance which varies with variations in the roll surface temperature. This resistance wire is electrically connected by conductors which pass through the fitting 26 and through a cable 38 to the measuring and control instrument 40 which may be an indicating and recording instrument. The instrument 40 is preferably of the pneumatically-operated type and receives operating air under pressure through a pipe 42. It operates to create a pneumatic pressure in pipe 44 that is a function of the resistance of the temperature measuring element and this pressure is transmitted through pipe 44 to the pressure controller 16 to automatically set the control point of the controller 16 and thereby so control the steam pressure within roll 10 as to maintain the surface temperature of the roll substantially constant. The resistance measuring portion of the instrument 40 may be conveniently constructed in accordance with the disclosure of U. S. patent application 496,438, filed July 28, 1943, by Howe and Cushman, and the pneumatically-operated portion of the instrument may be constructed in accordance with the disclosure of U. S. patent application. Serial No. 385.493, filed March 27, 1941, by Mason, now Patent No. 2,476,104.

Referring now to Figure 2 of the drawings, the temperature head comprises a rectangular casing 46 which is provided with a cover-plate 48 pivotally fixed to the top of the casing by a pin 50 and having a catch 52 at the bottom of the casing. The cover-plate is so mounted that it may be swung about its pivot 50 to expose the interior of casing 46. Fixed to the front of casing 46 by the screws 54 there is a plate or frame 56 having a central opening 58 (best shown in Figure 4) within which the temperature-sensitive element and its associated parts are resiliently supported by means of a series of springs 60. Each of the springs 60 is connected at one end to the frame 56 and at its other end is connected to one of a pair of right angle supports 62 which are in turn fixed to a face plate 64 by means of the rivets 66. Face plate 64 has a curved outer surface 68 that is curved to conform with the curvature of the surface of roll 10. It is desirably made of a low-friction, low-thermal-mass material that will withstand the temperatures encountered, e. g., a graphited heat-insulating bearing material. As shown in Figure 2, the outer ends of rivets 66 are countersunk so that face plate 64 presents a smooth surface to the roll.

Still referring to Figure 2, a sensitive element assembly generally designated as 70 is removably mounted against the rear face of face plate 68 and includes a thin metal shoe 72 that extends through a central hole 73 in face plate 64 and a rectangular insulating block 74. As shown in Figures 6 and 7, the shoe 72 includes a temperature-sensitive element comprising a mica strip 76 around which a fine resistance wire 78 is coiled. The wire 78 may be, for example, a selected nickel wire 0.0008 inch in diameter. A piece of glass fabric insulating material 80 impregnated with a silicone varnish is wrapped around the coil of resistance wire 78 as shown in Figure 6, and is held in place by the outer end of the shoe 72 which is bent back over the coil and its insulation to clamp them tightly in place. Shoe 72 is so mounted on the insulating block 74 that its tip bears resiliently against the surface of the roll 10 and thus the wire 78 assumes the same temperature as the roll surface. The portion of the tip of shoe 72 that comes in contact with the surface of the roll is preferably plated with a heavy layer of chromium to provide a wear-resisting surface. The ends of the coil 78 are connected to the thin conductive metal strips 79 and 79a which act as leads as described below.

Referring now to Figures 2 and 3, the roll-contacting tip of the shoe 72 is almost as wide as the opening 74 in the face plate 64, whereas the remainder of the shoe is relatively narrower, and since the shoe is made of relatively thin metal it is adapted to exert a small resilient force on the surface of the roll. At its inner end, the shoe 72 is fixed to the block 74 by a screw 82 which extends into the block 74 and engages a nut 84 within the block. Interposed between the inner end of shoe 72 and insulating block 74 there is a metal plate 86, e. g., an aluminum foil, that extends under the face plate 64. This plate 86 operates to conduct heat from the face plate 64 to the insulating block 74. If the plate 86 is omitted there is a tendency for heat to flow from the shoe 72 to the insulating block 74 and thereby cause the temperature of resistance element 78 to depart from the temperature of the roll surface. When the plate 86 is used, most of the heat flowing to the block 74 is supplied by the face plate 64 through plate 86, and hence the temperature of the element 78 may be maintained more nearly the same as the roll surface temperature.

The blank 74 is held in position against face plate 64 by a clamp 88 which includes a clamp-supporting member 90 held in fixed relation to the face plate 64 by the lower pair of rivets 66. The supporting member 90 extends along a groove in the lower side of block 74 and terminates in a hinge 92 which supports a clamping arm 94. A clamp-retaining member 96 is mounted in fixed relation to the face plate 64 by means of the upper pair of rivets 66. The clamp-retaining member 96 extends along a groove in the upper side of block 74 and terminates in a hook 98 adapted to engage clamping arm 94 and thus hold the member 94 against block 74 to hold the block 74 in position against face plate 64. As shown in Figure 2 the clamping arm 94 is bowed somewhat to ensure that the desired force will be maintained against block 74 to hold it in position against face plate 64. The construction is such that the hook 98 may be withdrawn to release clamping arm 94 and permit block 74 and the associated shoe 72 to be withdrawn from casing 46 for inspection or repairs.

The conductive strips 79 and 79a pass through the passages 100 and 100a, respectively, in the block 74 to a recess 102 in the rear face of the block. After the conductive strips have been passed through the passages 100 and 100a, the metal pegs 104 and 104a are driven into the passages 100 and 100a, respectively, to hold the conductive strips 79 and 79a in fixed positions in the passages. As shown in Figures 2 and 3, a loop of the conductive strips 79 and 79a is preferably formed at the front end of passages 100 and 100a to permit free movement of the shoe 72 with respect to block 74 without straining the conductive strips.

Referring to Figures 2 and 5, the ends of a pair of insulated conductors 106 and 106a, from the ends of which the insulation has been stripped, are caused to pass through the passages 108 and 108a of the block 74 and the ends of conductors 106 and 106a are soldered to the inner ends of conductive strips 79 and 79a and the pegs 104 and 104a respectively. Thus the strips 79 and 79a are effectively connected to conductors 108 and 108a and are held firmly against displacement from the block 74, while at the same time they permit relatively unrestricted movement of the shoe 72.

The opposite ends of conductors 106 and 106a are connected to the binding posts 110 and 110a respectively, which are in turn electrically connected to the binding posts 112 and 112a respectively. From the binding posts 112 and 112a the conductors 114 and 114a, respectively, lead through fitting 26 and cable 38 to the instrument 40. In accordance with conventional practice, a temperature-compensating lead 114b is provided and extends from binding post 112 to instrument 40.

At the front of the casing 46, as best shown in Figures 2 and 3, a pair of vertical strips 116 and 118 are provided that are held to the casing by the screws 54. The strips 116 and 118 are preferably made of a low-friction bearing material which may be the same bearing material as the face plate 64, and bear against the surface of the roll to limit displacement of the face plate 64 and prevent damage thereto.

In Figure 8 of the drawings there is shown an alternative construction of the sensitive element assembly 70 which includes means for supplying heat to the screw 82 and the block 74 that may be used either in place of or in addition to the conductive plate 86. Referring to Figure 8, a thin strip of metal 116 of high thermal conductivity is inserted under the head of screw 82 and is so shaped that it extends outwardly in the same general direction as the shoe 72 into contact with the surface of roll 10. The strip 116 serves to conduct heat from the roll surface to the screw 82 and the block 74 and thereby reduces the heat drawn from shoe 72 by block 74 and permits element 78 to be maintained at a temperature more nearly that of the roll surface. The strip 116 may be used either in place of or in addition to the plate 86 and, if desired, more than one strip 116 may be used. Both the strip 116 and the plate 86 provide an effective heat-conducting path between the roll surface and the screw 82 and block 74 that is independent of the shoe 72. If desired, the shoe 72 may be made of a resilient plastic to minimize heat flow therethrough and provided with metal bearing tip to which the element 78 is fixed.

The operation of the apparatus should be largely apparent from the foregoing description of its construction. The head 24 is mounted with the surface 68 of face plate 64 bearing against the surface of roll 10. The counterweight 32 is adjusted so that the face plate exerts a continuous light pressure against the roll surface. With the head in this position, the roll-engaging tip of the shoe 72 bears against the roll surface and the element 78 is maintained at the same temperature as the roll surface. The sensitive element is totally enclosed by heat insulating material and heat losses from the element are therefore minimized. The metal plate 86 conducts heat from the face plate 64 to the insulating block 74, and hence reduces heat flow by conduction from the shoe 72 to the insulating block. Since the shoe 72 is resilient, the element 78 has, in effect, a dual spring mounting, i. e., the shoe provides one resilient support for the element and the springs 60 provide a second resilient support.

The resistance of the element 78 is measured by the instrument 40 and indicated and recorded by the instrument. Also the instrument 40 produces a pneumatic pressure that is a function of the resistance of the element, and hence of the temperature of the roll surface, and this pressure is used to set the control point of pressure controller 16 to maintain the steam pressure within the roll at such a value as to maintain the roll surface temperature constant.

Since the temperature-sensitive element 78 is extremely small and has a very low thermal capacity, the device of the present invention is very sensitive to small temperature changes and has a high speed of response. The graphite-impregnated material of the face plate 64 minimizes wear on the roll surface and heat due to friction, as well as heat losses from the sensitive element. The construction is such that the tip of shoe 72 can be adjusted to rest very lightly against the surface whose temperature is to be measured. The control of this contact force reduces the frictional heating of the shoe tip to a negligible value even at surface speeds as high as several hundred yards per minute. The spring suspension of the face plate accommodates slight variations in roll concentricity and measuring head mounting. The mounting of the assembly 70 in the clamp 88 permits easy removal of the sensitive element for inspection, servicing or replacement.

It is, of course, to be understood that the foregoing description is illustrative only and that numerous changes may be made within the scope of the invention. As indicated above, the present device is not limited in its application to heated surfaces, but may also be used to measure the temperature of a chilled surface or, in fact, of a surface that is neither heated nor chilled. Also, the shoe 72 need not be in continuous contact with the roll surface. Because of the lightness of element 78 and its consequent sensitiveness and rapid response to temperature changes, satisfactory temperature measurements may be made when the element is positioned close to but not in actual contact with the roll surface. The element 78 may be a thermocouple as well as a resistance element, and, if such a substitution is made, the various structural elements of the head 24 will cooperate as described above. Other modifications within the scope of the invention will be apparent to those skilled in the art.

We claim:

1. In apparatus for measuring the surface temperature of a rotating roll, in combination, a temperature measuring head having a cavity adapted to confront said roll surface, a thin resilient strip mounted in said cavity and having a free end adapted to bear resiliently against the surface of said roll, a fine electrical resistance wire fixed to said free end of said resilient strip to cause the resistance of said wire to vary in response to variations in the surface temperature of said roll, said temperature head and said roll cooperating to enclose said resistance wire within said cavity and prevent ambient air currents from coming in contact with said wire, and electrical resistance measuring means connected to said wire to measure the resistance of said wire as a measure of the temperature of said roll surface.

2. In apparatus for measuring the surface temperature of a rotating roll, in combination, a temperature measuring head having a face plate adapted to bear against said roll surface and curved to conform with the curvature of said roll surface, said face plate having a central recess therein, a thin resilient strip mounted within said recess and having a free end adapted to bear against said roll surface, an electrical resistance element comprising a fine wire fixed to said free end of said resilient strip to cause the resistance of said element to vary in response to variations in the surface temperature of said roll, and electrical resistance measuring means connected to said element to measure the resistance of said element as a measure of the temperature of said roll surface.

3. In apparatus for measuring the surface temperature of a rotating roll, in combination, a temperature measuring head having a face plate adapted to bear against said roll surface and curved to conform with the curvature of said roll surface, said face plate being resiliently mounted in said measuring head and having a central recess, a thin resilient strip mounted in said recess and having a free end adapted to bear against said roll surface, an electrical resistance element comprising a fine wire fixed to said tip of said resilient strip to cause the resistance of said element to vary in response to variations in the surface temperature of said roll, and electrical resistance measuring means connected to said element to measure the resistance of said element as a measure of the temperature of said roll surface.

4. In apparatus for measuring the surface temperature of a rotating roll, in combination, a temperature measuring head having a heat and electrical insulating member resiliently mounted therein, a face plate fixed to said insulating member and adapted to bear against said roll surface, said face plate being curved to conform with the curvature of said roll surface and having a central recess therein, a thin resilient strip mounted on said insulating member and having a free end extending through said recess and adapted to bear against said roll surface, an electrical resistance element comprising a fine wire fixed to said free end of said resilient strip to cause the resistance of said element to vary in response to variations in the surface temperature of said roll, and electrical resistance measuring means connected to said element to measure the resistance of said element as a measure of the temperature of said roll surface.

5. In apparatus for measuring the surface temperature of a rotating roll, in combination, a temperature measuring head having a face plate adapted to bear against said roll surface, said face plate being curved to conform with the curvature of said roll surface and having a central recess therein, a thin resilient strip mounted within said recess and having a free end adapted to bear against said roll surface, an electrical resistance element comprising a fine wire fixed to said free end of said resilient strip to cause the resistance of said element to vary in response to variations in the surface temperature of said roll, a support of relatively low thermal conductivity for said resilient strip, clamping means for clamping said support to said measuring head whereby said support and resilient strip may be readily removed from said measuring head, and electrical resistance measuring means connected to said element to measure the resistance of said element as a measure of the temperature of said roll surface.

6. In apparatus for measuring the surface temperature of a rotating roll, in combination, a temperature measuring head having a face plate adapted to bear against said roll, said face plate being curved to conform with the curvature of said roll surface and having a central recess therein, a thin resilient strip mounted within said recess and having a free end adapted to bear against said roll surface, an electrical resistance element comprising a fine wire fixed to said free end of said resilient strip to cause the resistance of said element to vary in response to variations in the surface temperature of said roll, a support of relatively low thermal conductivity for said resilient strip mounted adjacent said face plate, heat-conductive means for effectively completing a thermal path between said roll surface and the point at which said strip is supported by said support to conduct heat between said roll surface and said support independently of heat flow between said surface and support through said strip and thereby minimize flow of heat through said strip, and electrical resistance measuring means connected to said element to measure the resistance of said element as a measure of the temperature of said roll surface.

7. In apparatus for measuring the surface temperature of a rotating roll, in combination, a temperature measuring head having a face plate adapted to bear against said roll, said face plate being curved to conform with the curvature of said roll surface and having a central recess therein, a thin resilient strip mounted within said recess and having a free end adapted to bear against said roll surface, an electrical resistance element comprising a fine wire fixed to said free end of said resilient strip to cause the resistance of said element to vary in response to variations in the surface temperature of said roll, a support of relatively low thermal conductivity for said resilient strip mounted adjacent said face plate, heat-conductive means for effectively completing a thermal path between said roll surface and the point at which said strip is supported by said support to conduct heat between said roll surface and said support independently of heat flow between said surface and support through said strip and thereby minimize flow of heat through said strip, said heat-conductive means comprising a metal sheet interposed between said face plate and said support and extending between said strip and said support at the point at which said strip is mounted on said support, and electrical resistance measuring means connected to said element to measure the resistance of said element as a measure of the temperature of said roll surface.

8. In apparatus for measuring the surface temperature of a rotating roll, in combination, a temperature measuring head having a face plate adapted to bear against said roll, said face plate being curved to conform with the curvature of said roll surface and having a central recess therein, a thin resilient strip mounted within said recess and having a free end adapted to bear against said roll surface, an electrical resistance element comprising a fine wire fixed to said free end of said resilient strip to cause the resistance of said element to vary in response to variations in the surface temperature of said roll, a support of relatively low thermal conductivity for said resilient strip mounted adjacent said face plate, heat-conductive means for effectively completing a thermal path between said roll surface and the point at which said strip is supported by said support to conduct heat between said roll surface and said support independently of heat flow between said surface and support through said strip and thereby minimize flow of heat through said strip, said heat-conductive means comprising a metal strip mounted at one end on said support at the point where said strip is mounted on said support and at its other end bearing resiliently against said roll surface, and electrical resistance measuring means connected to said element to measure the resistance of said element as a measure of the temperature of said roll surface.

9. In apparatus for measuring the surface temperature of a rotating roll, in combination, a temperature measuring head having a face plate adapted to bear against said roll, said face plate being curved to conform with the curvature of said roll surface and having a central recess therein, a thin resilient strip mounted within said recess and having a free end adapted to bear against said roll surface, an electrical temperature responsive element fixed to said free end of said resilient strip to cause an electrical characteristic of said element to vary in response to variations in the surface temperature of said roll, a support of relatively low thermal conductivity for said resilient strip mounted adjacent said face plate, heat-conductive means for effectively completing a thermal path between said roll surface and the point at which said strip is supported by said support to conduct heat between said roll surface and said support independently of heat flow between said surface and support through said strip and thereby minimize flow of heat through said strip, and electrical measuring means connected to said element to measure said electrical characteristic of said element as a measure of the temperature of said roll surface.

MEAD BRADNER.
ALBERT ALLEN.

REFERENCES CITED

The following references are of record in the file of this patent:

UNITED STATES PATENTS

| Number | Name | Date |
| --- | --- | --- |
| 1,220,635 | Hunter et al. | Mar. 27, 1917 |
| 1,717,849 | Maynard | June 18, 1929 |
| 1,730,308 | Thwing | Oct. 1, 1929 |
| 2,062,922 | Wunsch | Dec. 1, 1936 |
| 2,095,877 | Junkins | Oct. 12, 1937 |
| 2,379,317 | Picciano | June 26, 1945 |